June 12, 1945.   U. A. INMAN   2,378,018
APPARATUS FOR BALANCING WHEELS
Filed June 9, 1941   3 Sheets-Sheet 1
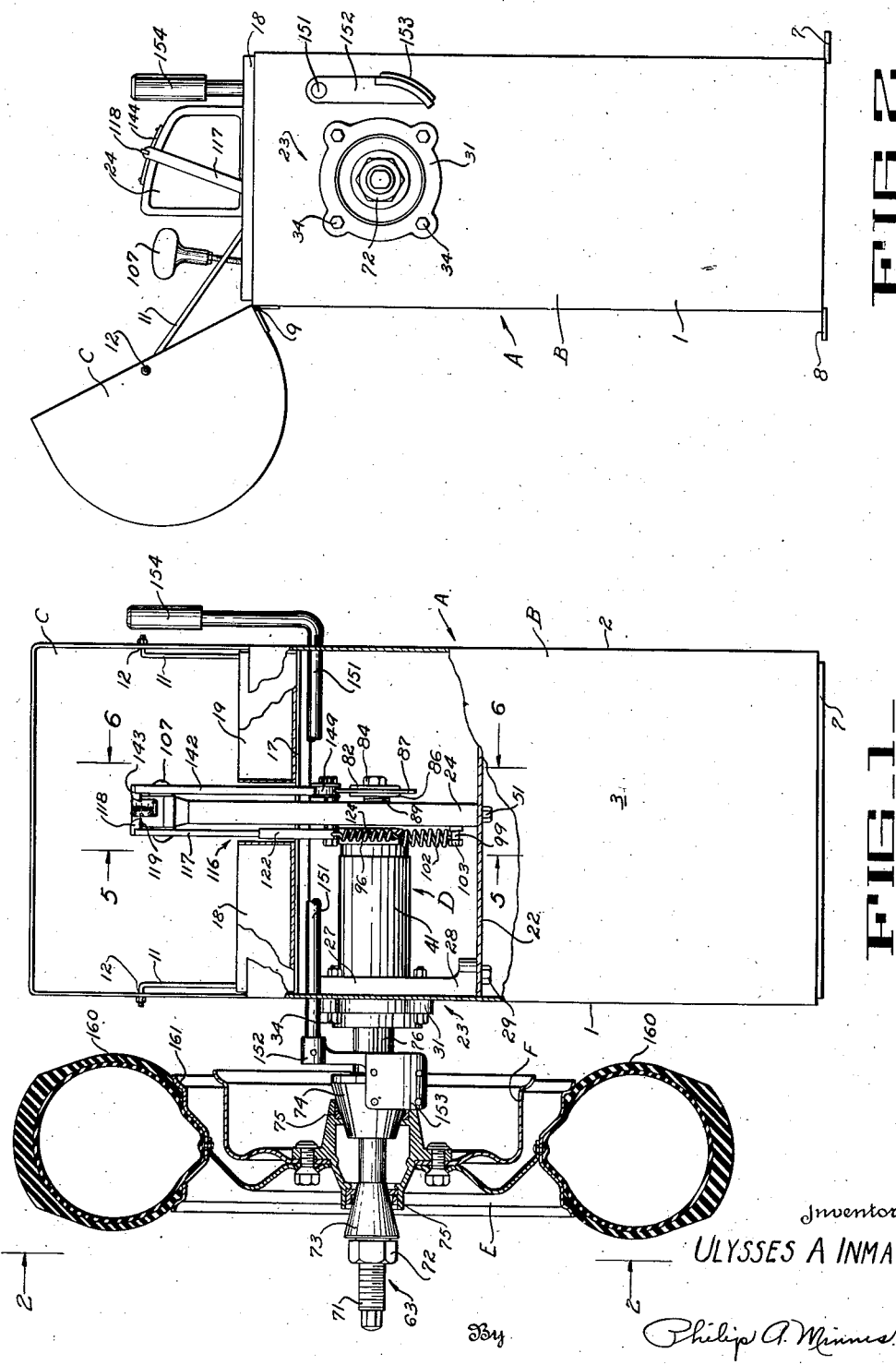
Inventor
ULYSSES A INMAN

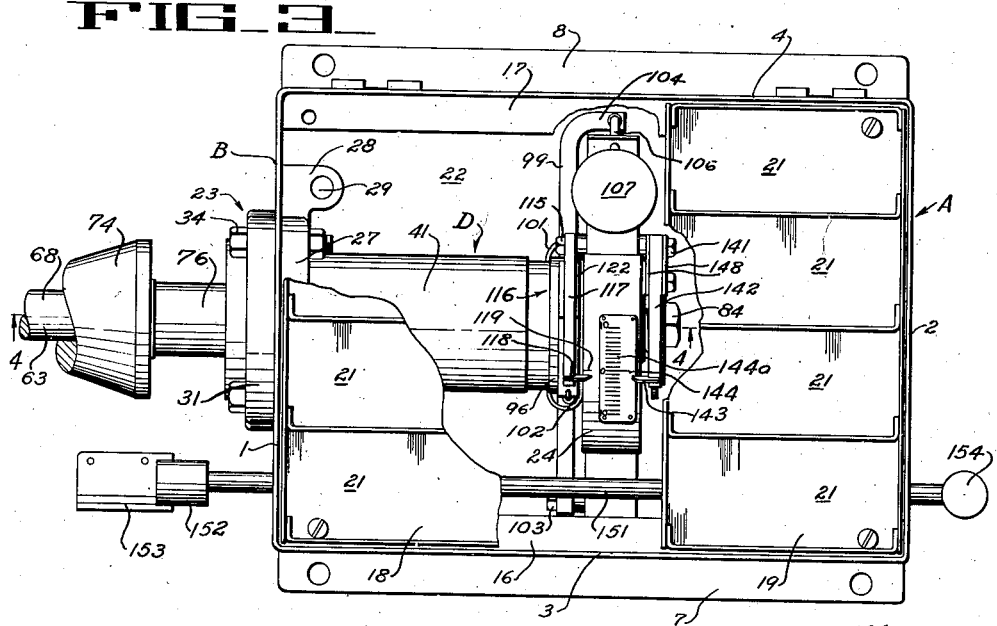

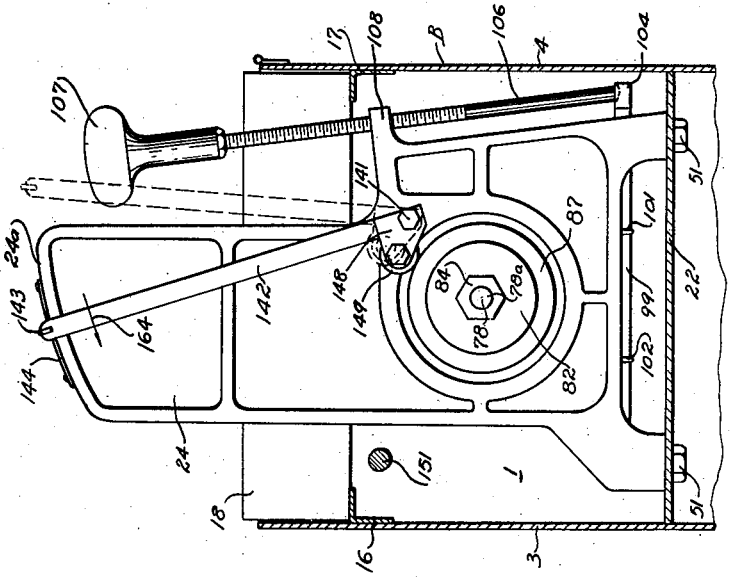
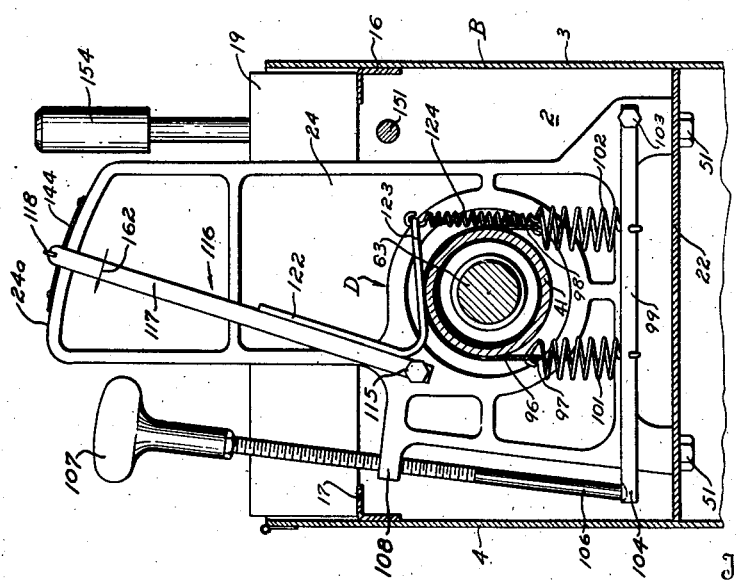
Inventor
ULYSSES A. INMAN

Patented June 12, 1945

2,378,018

UNITED STATES PATENT OFFICE 2,378,018

APPARATUS FOR BALANCING WHEELS

Ulysses A. Inman, Long Beach, Calif.

Application June 9, 1941, Serial No. 397,232

5 Claims. (Cl. 73—66)

The present invention relates to an apparatus for testing the balance of rotatable objects, such as automobile wheels or the like, and for correcting static and dynamic unbalance of the same.

An object of the invention is to provide an apparatus for testing the static balance of rotatable objects in a very simple and accurate manner.

Another object is to provide an apparatus for testing the static and dynamic balance of rotatable objects under substantially the same conditions irrespective of the size and weight of the objects.

Another object is to provide an apparatus for testing the dynamic balance of rotatable objects at various speeds of rotation thereof to determine the speeds at which the amplitude of vibration of the objects due to dynamic unbalance is most pronounced.

Another object is to provide an apparatus for testing the dynamic balance of rotatable objects which comprises means for continuously indicating the amount of dynamic unbalance during rotation of the objects to determine the speeds at which the amplitude of vibration of the objects due to dynamic unbalance is most pronounced.

Another object is to provide an apparatus for testing the dynamic balance of rotatable objects which comprises means for indicating the amount and location of unbalanced centrifugal forces acting upon the objects during rotation of the same.

Another object is to provide an apparatus for testing the dynamic balance of rotatable objects which comprises a rotatable support adapted to precess under the influence of dynamic unbalance of the objects about a nodal point positioned in close relation to the center of gravity of the objects.

Another object is to provide an apparatus for testing the dynamic balance of rotatable objects wherein the lag of indicated out of balance positions is maintained substantially the same for all testing conditions of the machine.

Other and further objects and advantages of the present invention will become apparent from the following description taken in connection with the accompanying drawings, in which:

Fig. 1 is a longitudinal section of the apparatus of the present invention and an automobile wheel attached to the same, certain parts being shown in elevation.

Fig. 2 is a front view of the machine of Fig. 1 looking in the direction of lines 2—2 thereof, the wheel illustrated in Fig. 1 being omitted.

Fig. 3 is an enlarged top view of the balance tester shown in Fig. 1, the cover being removed and certain parts being broken away.

Fig. 4 is a longitudinal section through the indicating mechanism and a portion of the housing and arbor of the machine, the view being taken along lines 4—4 of Fig. 3. Certain parts of the indicating mechanism have been broken away.

Fig. 5 is an enlarged section of the vibration indicator mechanism of the machine, the view being taken along lines 5—5 of Fig. 1.

Fig. 6 is an enlarged end view of the balance indicating mechanism looking in the direction of lines 6—6 of Fig. 1.

Fig. 7 is an enlarged sectional view of the indicator disc and its associated parts.

Referring now to Figs. 1 and 2 of the drawings, A indicates the housing of the machine which comprises a base structure B and a cover C. The base structure B consists of a front wall 1, a rear wall 2 and side walls 3 and 4 forming a supporting structure for the balance testing mechanism D of the machine. Secured to the side walls 3 and 4 of the base structure B (see Figs. 2 and 3) are flanges 7 and 8, respectively, for mounting the machine to a base such as the floor of a building or the like in any convenient manner.

The cover C is hinged to the upper end of the side wall 4 of the housing, as shown at 9, while brace rods 11 pivotally mounted at 12 to the cover C and slidably secured to the base structure B in any conventional manner are employed for supporting the cover in its open position as shown in Fig. 2.

Secured to the side walls 3 and 4 near the upper end of the base structure B are angle irons 16 and 17, respectively, and removably positioned within the upper portion of the base structure B and supported by the angle irons 16 and 17 above referred to are spaced trays 18 and 19 provided with a plurality of compartments 21 for storage of balance weights of various sizes.

Mounted within the base structure B and secured to the end and side walls thereof in any convenient manner is a base plate 22 (see Figs. 1 and 4 to 6 inclusive) for supporting the balance testing mechanism D of the machine by means of a sleeve bearing 23 and a frame 24 arranged in spaced relation with respect to each other. The sleeve bearing 23 comprises an inner annular bearing portion 27 provided with a bracket 28 secured by means of cap screws 29 to the base plate 22 (see Figs. 1 and 4) and an outer annular bearing portion 31 attached to the front wall 1 of the housing A and the inner bearing ring 27 by means of bolts 34.

The inner and outer annular bearing portions 27 and 31 are provided with circular openings 36 and 37, respectively, while the front wall 1 is provided with a circular opening 38 of larger diameter than the bearing openings 36 and 37 (see Fig. 4). Positioned within the sleeve bearing 23 and the frame 24 is a sleeve 41 of somewhat smaller diameter than the openings 36 and 37 of the sleeve bearing 23.

Interposed between the sleeve 41 and the sleeve bearing 23 is a bearing ring 42, preferably made from soft rubber or similar flexible material, positioned within an annular groove 43 of the sleeve 41 and extending into adjacent annular grooves 46 and 47 in the bearing members 27 and 31, respectively. The curvature of the grooves 46 and 47 is such that the rubber ring 42 is compressed and forced tightly against the sleeve 41 when the bolts 34 are tightened and the bearing members 27 and 31 are forced toward each other. This provides a resilient mounting for the end 48 of the sleeve 41 of considerable rigidity so that the sleeve is normally held in proper centered position with respect to the sleeve bearing 23 and the opening 38 in the front wall 1 of the housing A, while permitting universal lateral movement as well as universal tilting movement of the sleeve 41 within the bearing 23 during operation of the machine in a manner to be described later on.

The frame 24 previously referred to is secured to the base plate 22 by means of cap screws 51 and extends vertically from the base plate 22 through the space between the trays 18 and 19 a considerable distance above the base structure B of the machine (see Figs. 1 and 4 to 6). This frame is provided with a circular opening 52 of considerably larger diameter than the diameter of the end 53 of the sleeve 41 which extends into said opening and is supported therein by means of a bearing ring 54. The ring 54 is of circular cross section and is received within an annular groove 58 in the frame 24.

The ring 54 is made from resilient material, preferably from soft rubber of moderate rigidity, to permit universal lateral movement of the end 53 of the sleeve 41 within the opening 52 of the frame 24.

Rotatably mounted within the sleeve 41 by means of ball bearings 61 and 62 is an arbor or wheel supporting shaft 63. The arbor 63 comprises portions 64 and 65 of reduced diameter upon which the inner races of the ball bearings 61 and 62, respectively, are pressed while the outer races of these bearings are pressed into annular recesses 67 and 68, respectively, of the ends 48 and 53 of the sleeve 41 (see Fig. 4) so that the arbor 63 is properly secured within the sleeve 41 but is free to rotate within the same. The front portion 68 of the arbor 63 protrudes from the sleeve 41 and is of reduced diameter with respect to the arbor portion 64, so that a shoulder 69 is formed. The front end of the arbor portion 68 is threaded as shown at 71, and provided with a clamping nut 72, which bears against a cone 73 (see Figs. 1 and 4). This cone is freely slidable upon the arbor portion 68 and is adapted to cooperate with a second cone 74 on the arbor portion 68. The cone 74 is freely slidable on the arbor portion 68 and held in spaced relation with respect to the bearing 61 by means of a spacer sleeve 76 adapted to engage the shoulder 69 between the arbor portions 64 and 68.

The wheel or object to be tested is mounted upon the portion 68 of the arbor 63 in such a manner that the cones 73 and 74 enter into and engage bearings 75 in the hub portion thereof which take the place of the usual roller bearings of the wheel during the testing operation (see Fig. 1). Thereupon the nut 72 is tightened, whereby the wheel is clamped in properly centered position upon the arbor 63 for rotation as a unit therewith.

The arbor 63 comprises further a portion 78 of comparatively small diameter upon which a washer 79 is arranged which engages a shoulder 81 intermediate the arbor portions 65 and 78. Positioned upon the arbor portion 78 is further a plate 82 held in spaced relation with respect to the washer 79 by means of a sleeve 83 while a nut 84 secured to the threaded end 78a of the arbor portion 78 and engaging the plate 82 is adapted to hold the washer 79, sleeve 83 and plate 82 in fixed position on the arbor 63 (see Fig. 4). Freely slidable and rotatable on the sleeve 83 is a plate 86 and interposed between the plates 82 and 86 is a circular indicator disc 87 of considerably larger diameter than plates 82 and 86. This disc 87 is provided with a large circular opening 88 within which the sleeve 83 is received. A coil spring 89 intermediate the washer 79 and plate 86 is adapted to maintain the plate 86 in engagement with the disc 87 so that the same is held in frictional engagement between the plates 82 and 86 for rotation therewith but permitting universal lateral shifting movement of the disc 87 in a manner to be described later on.

Positioned adjacent the frame 24 and extending around the upper portion of the sleeve 41 is a metal band 96. Interposed between the free ends 97 and 98 of the metal band 96 and a lever or bar 99 are coil springs 101 and 102, respectively, which serve to hold the metal band 96 against the sleeve 41 under predetermined pressure sufficient to counteract the weight of a wheel E mounted upon the arbor 63, so as to maintain the arbor in proper horizontal position.

One end of the lever 99 is pivotally secured at 103 to the frame 24 while the free end of the lever 99, as shown at 104, is engaged by an adjustment screw 106 provided with a handle or knob 107. The adjustment screw 106 is threadedly received within an interiorly threaded portion 108 of the frame 24, so that upon rotation of the knob 107 and adjustment screw 106 in one or the opposite direction the lever 99 may be raised or lowered to increase or decrease the tension of the coil springs 101 and 102 to thereby permit a substantial horizontal alignment of the arbor 63 with respect to the bearing 23 and frame 24, irrespective of the weight of the wheel to be tested.

Pivotally mounted on the frame 24 at 115 is a vibration indicator mechanism 116 comprising a vibrator arm 117 extending slightly above the curved upper end 24a of the frame 24, and provided with a pointer 118. Rigidly secured to the vibrator arm 117 is an angle member 122, the horizontal portion 123 of which is held in engagement with the metal band 96 by means of a coil spring 124 interposed between the free end of the horizontal portion 123 of the angle 122 and the upper end of the coil spring 102, so that the vibrator arm is normally held in a position as shown in Figs. 3 and 5 with the pointer 118 in alignment with a mark or line 119 on the upper portion 24a of the frame 24 (see Figs. 1 and 3). When the vibrator arm is in this position, i. e., the pointer 118 thereof in alignment with the mark 119, the arbor 63 is in proper horizontal alignment with respect to the bearing 123 and frame 24. If the pointer 118 is not in alignment with the mark 119, the arbor 63 is not properly positioned in its horizontal plane but is slightly tilted. This may be due either to the weight of the wheel E slightly compressing the lower portion of the rubber ring 42 or excessive tension of the springs 101 and 102. In either case the proper alignment of the arbor 63 is effected by turning the knob 107 in one or the other direction, until the pointer 118 is is alignment with the mark 119.

Pivotally mounted on the frame 24 at 141 above the disc 87 is an indicator arm 142 extending slightly above the curved end 24a of the frame 24 and provided with a pointer 143 adapted to cooperate with a plate 144 secured upon the upper end 24a of the frame and provided with calibrations 144a. Secured to the lower end of the indicating arm 142 adjacent its pivot 141 are spaced plates 148, and rotatably mounted between the same is a roller 149 adapted to engage the periphery of the disc 87 when the indicating arm 142 is swung from its inoperative or dotted line position to its operative or full line position, as shown in Fig. 6.

Pivotally mounted on the base structure B by means of a rod 151 is a brake mechanism 152 having a brake shoe 153. The rod 151 comprises a handle portion 154 for moving the brake shoe 153 into operative position in which it will engage the brake drum F of the wheel E to be tested (see Fig. 1).

The operation of the balance tester is as follows: The indicator arm 142 is placed into inoperative position as shown in dotted lines in Fig. 6 and the automobile wheel to be tested is mounted upon the arbor 63 in the manner previously stated. Thereupon the distance between the side 160 of the tire of the wheel and the front wall 1 of the housing A is noted. This distance should be approximately 1 to 1½ inches for all wheels to be tested so that the conditions under which they are tested are substantially the same. Therefore, for tires and wheels of various widths it may be necessary to replace the spacer sleeve 76 with a longer or shorter sleeve of the same construction supplied with the machine so as to obtain the proper spacing of the tire from the front wall 1.

Thereupon the position of the pointer 118 is observed and if the same is not in proper alignment with the mark 119 on the upper end 24a of the frame 24, then the arbor 63 is not in proper horizontal alignment. To obtain a substantial horizontal alignment of the arbor 63 the knob 107 is turned in one or the opposite direction until the pointer 118 is opposite the mark 119. Upon completion of the above adjustment the apparatus is in proper condition for testing the static balance of the wheel.

In testing the static balance of the wheel the same is manually turned 90 degrees and released, while at the same time the vibrator arm 117 is snapped or jarred several times by slightly forcing the arm 117 in the direction of arrow 162 (see Fig. 5) and subsequently releasing the same. By this procedure the sleeve 41 and bearings 61 and 62 are tapped whereby any slight friction in the roller bearings is overcome and a free turning of the arbor and wheel under the influence of the slightest static unbalance is obtained, so that when the wheel is statically unbalanced the same will turn and come to rest with the heavy portion of the wheel at the bottom thereof. From the speed with which the wheel rotates to the position in which it finally comes to rest the operator can judge the size of the weight necessary to statically balance the wheel. This weight is applied at the top of the wheel on the side of the rim adjacent the housing of the machine designated 161 in Fig. 1.

After the weight has been firmly secured at this point the wheel is again turned 90 degrees and released while at the same time the vibrator arm 117 is snapped several times in the same manner as above described and the operator observes if the wheel remains stationary or rotates. If the wheel remains stationary the added weight is of correct size and the wheel is statically balanced. If the wheel turns, the weight is replaced with a weight of different size and the above turning of the wheel and jarring of the vibrator is repeated until the weight of proper size to statically balance the wheel is found. It may be necessary to obtain static balance of the wheel to use two small weights instead of one large weight, spacing them equidistant from the located position on the rim, i. e., equidistant from the position of the single weight originally attached to the rim.

After the wheel has been statically balanced as above described the same is rapidly rotated at a speed of approximately 30 to 35 miles per hour (360 to 420 R. P. M.) which corresponds to the average low operating speed of an automobile wheel, by means of a portable wheel spinner of conventional design, carrying with it the arbor 63 and disc 87. If the wheel is dynamically unbalanced the unbalanced forces will cause the wheel and arbor 63 to wobble so that the arbor will tilt and the ends thereof will precess or gyrate about the normal horizontal axis of the arbor, which may be termed the reference axis. This wobbling movement is imparted to the sleeve 41 causing a corresponding universal lateral movement or vibration of the same. However, the sleeve will not be rotated as it is nonrotatably mounted within the bearing rings 42 and 54 of the bearing 23 and frame 24, respectively.

Due to the flexible but nevertheless comparatively rigid mounting of the sleeve 41 by means of the compressed rubber ring 42, the arbor 63 will precess about a node located on the reference axis somewhere between the bearing 23 and the plane of rotation of the wheel, i. e., close to the center of gravity of the wheel. The position of the nodal point is primarily dependent upon the degree of compression of the rubber ring 42 which should be such as to keep the nodal point always in the same position and as close as possible to the center of gravity of the wheel, because any appreciable variation of the position of the nodal point with respect to the bearing 23 introduces an error in the amount of indicated out of balance weight of the wheel.

The vibrations imparted upon the sleeve 41 by the precession of the arbor 63 about the reference axis are transferred to the vibrator arm 117 by means of the band 96 and angle member 122, so that the arm 117 is correspondingly vibrated about its pivot 115.

While the operator observes the amplitude of the vibrations of the vibrator arm 117 the speed of rotation of the wheel is increased to approximately 35 to 40 miles per hour (540 to 600 R. P. M.) to determine if the maximum vibration of the wheel and arbor has been reached. If no increase in the amplitude of vibration of the vibrator arm 117 is noted during this acceleration of the speed of rotation of the wheel, the spinner is disengaged from the tire of the wheel and while the latter is now rotating at this speed the indicator arm 142 is swung into operative position, as shown in full lines in Fig. 6, so that the roller 149 engages the periphery of the disc 87.

While the roller 149 is engaged with the disc 87 and the wheel E and arbor 63 rotate at the desired testing speed and wobble about the reference axis, as above stated, the operator exerts a slight pressure upon the indicator arm 142 in the direction of the arrow 164 (see Fig. 6) and the disc 87 is laterally shifted until it runs true, i. e., concentric to the reference axis. The disc 87 is properly centered when the indicator arm does not vibrate while the roller 149 is lightly held in engagement with the periphery of the disc 87. Thereupon the indicator arm is returned to inoperative position and the roller 149 is disengaged from the disc. The brake is applied by manipulation of the handle 154 and the wheel is stopped so that the arbor 63 assumes its normal horizontal position.

The indicator arm 142 is now carefully swung to operative position as shown in full lines in Fig. 6, so that the roller 149 thereof engages the periphery of the disc 87. It should be noted, however, that the roller 149 must be carefully engaged with the periphery of the disc 87, so that the setting of this disc with respect to the arbor 63 is not disturbed.

When the roller 149 is engaged with the periphery of the disc 87 and the wheel is slowly rotated by hand the indicator arm 142 will be moved back and forth about its pivot 141, due to the eccentricity of the disc 87 with respect to the arbor 63, and the operator observes the total travel of the pointer 143 of the indicator arm over the plate 144. When the pointer is in its lowermost position the wheel is stopped and a weight is attached to the rim of the wheel at the top of the side facing away from the front wall 1 of the housing of the machine. From the amount of total travel of the indicator pointer 149 the operator is in a position to judge the size of the weight to be added at this point of the rim to balance the centrifugal forces acting upon the wheel during rotation of the same.

It should further be noted that in carrying out the above procedure the speed at which the maximum vibration of the vibrator arm occurs is determined and by subsequently accelerating the speed of rotation, as previously described, a test is made to determine if the point of maximum vibration or wobble of the wheel has been reached. If the maximum vibration of the vibrator arm is obtained this is the speed at which the above test is performed. If the vibration of the vibrator arm increases, however, the acceleration of the speed of rotation of the wheel is continued until the maximum vibration or wobble of the same is obtained and in such case the balancing of centrifugal forces acting upon the wheel is performed at this speed. In either case, the size of the weight and its position on the wheel is determined in the same manner as above stated.

Due to the fact that in counterbalancing the centrifugal forces another balance weight has been attached to the rim of the wheel the static balance of the wheel previously obtained by the weight secured to the inner side of the rim adjacent the front wall 1 of the housing of the machine has been disturbed. It is therefore necessary in pursuing further the method of balancing the wheel to again test and correct the static balance of the wheel in the same manner as previously set forth herein. The static balancing of the wheel is effected by increasing or decreasing the weight at the inner side of the rim and/or changing the postion of this weight on the rim.

After the static unbalance has been corrected the wheel is again rapidly rotated with the wheel spinner previously referred to, and the vibrations of the vibrator arm 117 are observed by the operator. The speed of rotation of the wheel is gradually and continuously accelerated until the maximum vibration of the vibrator arm 117 is observed. It may be necessary to increase the speed of the wheel up to approximately 65 miles per hour (800 R. P. M.) until the maximum vibration of the vibrator arm 117 is obtained. The speed corresponds to the average high operating speed of an automobile wheel. When this speed has been reached the spinner is disengaged from the wheel and while the wheel and arbor 63 continue their rotation at this speed and wobble about the reference axis the indicator arm 142 is swung to operative position, as shown in full lines in Fig. 6, and the roller 149 thereof is engaged with the periphery of the indicator disc 87. By exerting a slight pressure against the indicator arm 142 the disc 87 is centered with respect to the reference axis in the same manner as previously referred to. When the disc 87 has been centered the indicator arm 142 is returned to inoperative position whereby the roller 149 is disengaged from the periphery of the disc 87. The wheel is now stopped by application of the brake and the indicator arm 142 is moved into operative position so that the roller 149 will engage the periphery of the disc 87. Care should be taken, however, that the setting of the disc 87 is not disturbed thereby. With the indicator in this position the wheel is now slowly rotated by hand whereby a back and forth movement of the indicator arm 142 is obtained in view of the eccentricity of the disc 87 with respect to the arbor 63.

While the wheel is manually rotated in the above manner the operator observes the movement of the pointer 143. When the pointer 143 is in its lowermost position the wheel is stopped and the position of the weight previously applied to the outer rim of the wheel is observed. When this weight is at the top of the wheel, the weight is too light and the same is replaced by a heavier weight; usually a ½ ounce heavier weight will be sufficient. If the position of the weight on the outer rim portion is less than 90° down from the top of the wheel this indicates that the top of the wheel is too light and that the weight on the outer rim is not exactly in the right position.

It has been found by practical experience that when the weight at the outer side of the rim is approximately 80° down from the top point of the wheel, this condition of unbalance of the wheel may be eliminated by moving the weight on the outer side of the rim approximately 2" up the rim line toward the top of the wheel.

Should the weight on the outer rim side be in a position approximately 20° from the top point of the wheel when the indicator pointer 143 is at its lowermost position, it has been found by practical experience that by moving this weight approximately 1" along the rim line toward the top of the wheel the indicated unbalance of the wheel may be corrected. If the weight is in other positions at the upper half of the wheel when this test is made the weight is shifted upwardly along the rim of the wheel a greater or shorter distance than above stated, depending upon the distance of the weight from the top of the wheel. If the weight at the outer side of the rim is in the lower half of the wheel when the pointer 143 is in its lowermost position, the weight is too heavy and the same should be replaced with a lighter weight; usually a half ounce lighter weight will be found to be sufficient. Care should be taken that this lighter weight is secured to the outer rim side at the same position previously occupied by the heavier weight.

After the balance weight on the outer side of the rim has been shifted or changed, as above stated, the wheel is again rapidly rotated at approximately 800 R. P. M. If the amplitude of the vibrations of the vibrator arm 117 at the pointer 118 thereof is not greater than $\frac{1}{32}$ of an inch the wheel is in proper dynamic balance for all practical purposes. However, if the amplitude of the vibrations is larger than $\frac{1}{32}$ of an inch the static balance of the wheel is again tested and corrected. Thereupon the amount and location of any remaining centrifugal unbalance of the wheel is determined by use of the indicator arm 142 and indicator disc 87 in the same manner as last described, and the weight on the outer rim side is again shifted along the rim line a distance depending upon the position of this weight when the pointer 143 is in its lowermost position.

The testing of the wheel and the correction of any unbalanced condition thereof is completed when the pointer 118 of the vibrator arm 117 does not show vibration at any of the testing speeds above mentioned, or only a slight vibration, the amplitude of which does not exceed $\frac{1}{32}$ of an inch measured at the pointer 118 of the vibrator arm 117.

It should be understood, however, that the utility of my machine is not limited to any particular method, but that other methods for testing and correcting the dynamic balance of a rotatable object may be practiced with it.

As an illustration of one such alternative method, a wheel may first be statically balanced in the same manner as described in the first static balance test set forth herein, and thereupon the wheel may be rapidly rotated at approximately 600 to 800 R. P. M. by means of a wheel spinner. Thereupon the spinner is disengaged from the wheel so that the same is free to wobble under the influence of any dynamic unbalance thereof. This wobbling motion of the wheel is transferred to the arbor 63 which will precess or gyrate about the reference axis in the same manner as previously referred to herein.

While the wheel and arbor rotate and wobble about the reference axis the indicator arm 142 is swung to operative position so that the roller 149 engages the disc 87. By applying a slight pressure against the indicator arm 142 in the direction of the arrow 164 (see Fig. 6) the disc 87 is laterally shifted into a position concentric to the reference axis, whereupon the indicator arm 142 is swung to inoperative position and the roller 149 is disengaged from the disc 87.

The wheel is now stopped by the brake mechanism of the machine and the indicator arm 142 is swung into operative position so that the roller 149 engages the periphery of the disc 87 without disturbing the setting of the same. With the indicator arm in this position the wheel is manually rotated and the total amount of travel of the pointer 143 of the indicator arm 142 is observed, which enables the operator to judge the size of the weights necessary to dynamically balance the wheel. When the pointer 143 is in its lowermost position the wheel is stopped and a weight of proper size is applied to the top of the wheel at the outer side of the rim facing away from the front wall 1 of the machine, while a weight of equal size is attached to the bottom of the wheel at the inner side of the rim adjacent the front wall 1 of the machine.

While I have shown and described a preferred embodiment of my invention, it will be understood that it is capable of variation and modification, while still employing the principles of my invention. It is to be understood, therefore, that the scope of the invention should be limited only by the scope and proper interpretation of the claims appended hereto.

Having thus described my invention, what I claim and desire to protect by U. S. Letters Patent is:

1. In a balance testing apparatus a support, an arbor, means rotatably mounting said arbor on said support for universal lateral movement relative thereto, a lever pivotally mounted on said support, resilient means secured to said lever and mounting means, and means for moving said lever relative to the mounting means to vary the tension of said resilient means whereby to dispose the mounting means and arbor in a predetermined position relative to said support.

2. In a balance testing apparatus, a support, an arbor, means rotatably mounting said arbor for universal lateral movement with respect to said support, a scale on said support, an indicator on said support and cooperating with said arbor mounting means and scale for indicating the amplitude of vibrations of the arbor when the latter is rotating, and means for adjusting the position of the arbor relative to the support to dispose the indicator in a predetermined position relative to said scale when said arbor is at rest, said adjusting means including a lever movably mounted on the support, resilient means secured to said arbor mounting means and lever, and means for retaining said lever in adjusted position.

3. In a balance testing apparatus, a support, spaced resilient mountings on said support, means engaging said mountings for rotatably supporting an arbor for universal lateral movement relative to said support, said arbor being adapted to carry a wheel to be tested outside said mountings, a scale on said support, an indicator movably mounted on said support and cooperating with said arbor and scale for indicating the amplitude of vibrations of the arbor on said scale, a resilient arbor positioning device mounted on said support intermediate said mountings and engaging said means, and means for adjusting said positioning device to move the arbor relative to the support and to thereby dispose said indicator in a predetermined position relative to said scale when said arbor is at rest.

4. In a balance testing apparatus, a support, an arbor, means for rotatably mounting said arbor for universal lateral movement with respect to said support, a scale on said support, a vibratory arm mounted on said support in engagement with said arbor mounting means for vibration therewith in correspondence with the vibration of said arbor during rotation of the same and cooperating with said scale for indicating the amplitude of vibrations of the arbor, a bar movable on the support, resilient means secured to said bar and arbor mounting means, whereby upon movement of said bar relative to the support the tension of the resilient means is varied to move the arbor mounting means relative to the support, and means for retaining said bar in such position that said arm is disposed in predetermined relation to said scale while said arbor is at rest.

5. In a balance testing apparatus, a support, an arbor, means rotatably mounting said arbor for universal lateral movement with respect to said support, a scale on said support, an arm movably mounted on said support, means for maintaining said arm in engagement with said arbor mounting means for vibration therewith in correspondence with the vibration of said arbor during rotation of the same, said arm cooperating with said scale for indicating the amplitude of vibrations of the arbor thereon, a lever movable on the support, resilient means secured to said lever and arbor mounting means, and means for moving said lever relative to said support for varying the tension of said resilient means to move the arbor mounting means relative to the support and to dispose said arm in a predetermined position relative to said scale when said arbor is at rest.

ULYSSES A. INMAN.